June 14, 1949.　　　　　C. CONTERNO　　　　　2,472,793
GAS STOVE VALVE OPERATOR GUARD
Filed June 12, 1947
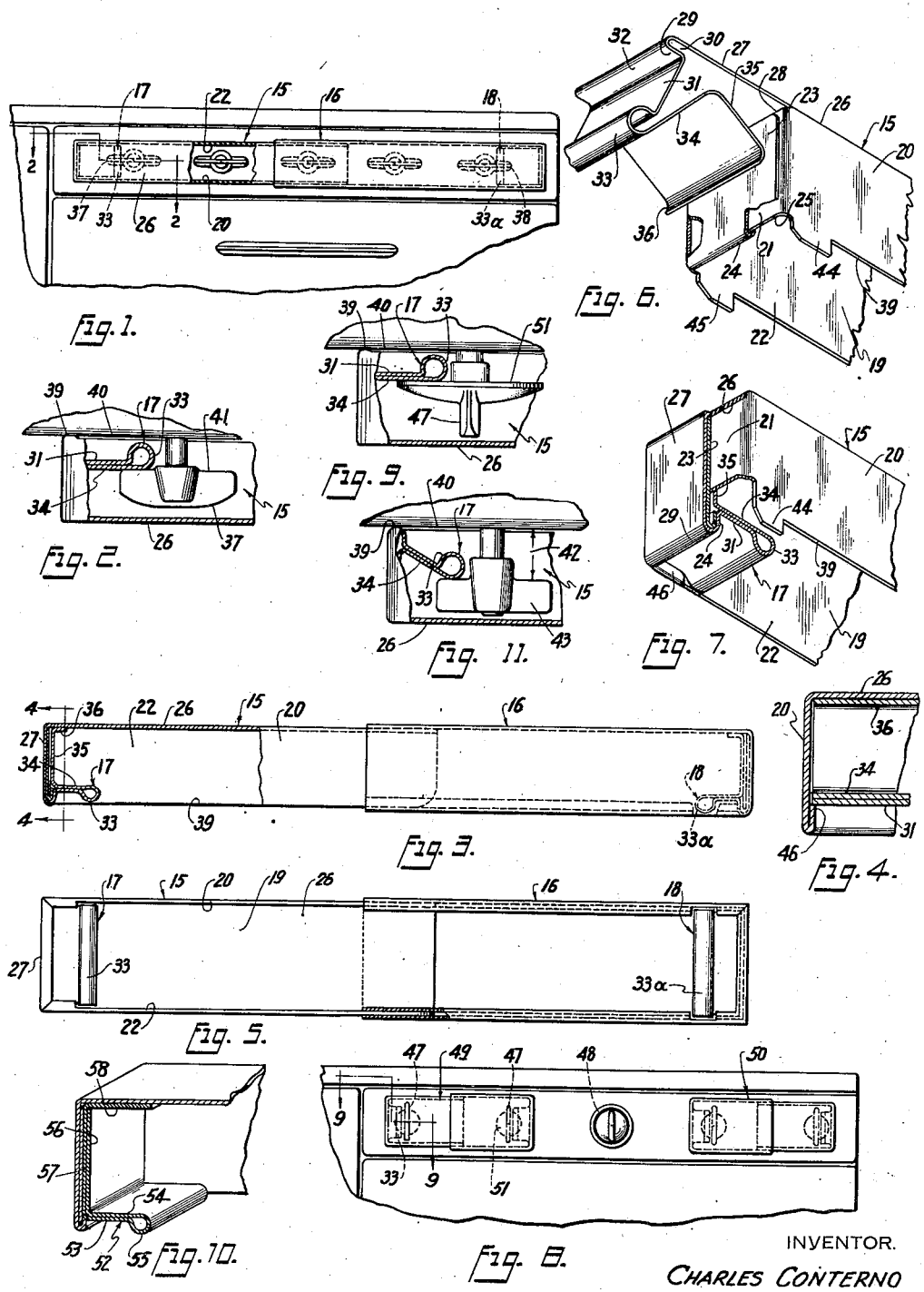
INVENTOR.
CHARLES CONTERNO
BY
ATTORNEY Patented June 14, 1949

2,472,793

UNITED STATES PATENT OFFICE 2,472,793

GAS STOVE VALVE OPERATOR GUARD

Charles Conterno, Brooklyn, N. Y.

Application June 12, 1947, Serial No. 754,295

4 Claims. (Cl. 126—42)

This invention relates to gas oven guards—more particularly to devices adapted for temporary placement over gas oven pet cocks or jet control valves.

The accidental opening of gas jets, or their deliberate manipulation by children, has always been a source of danger to users of gas ovens, and it is accordingly within the contemplation of this invention to eliminate this danger by providing a guard device that can conveniently serve as a cover for the pet cocks of an oven when it is desired to prevent their being manipulated.

It is a further important object of my invention to provide a device of this character that can be adjustably fitted to ovens of various sizes, employing different arrangements and numbers of pet cocks.

A further object is to enable the device to be readily attached and detached, so that it may be firmly and yieldably held in place.

And it is also within the contemplation of my invention to provide a device in accordance with the aforesaid objectives which will be simple and inexpensive to fabricate.

Other objects, features and advantages will appear from the drawings and the description hereinafter given.

Referring to the drawings,

Figure 1 is a fragmentary front view of a gas oven showing my invention in place over an arrangement of five horizontal pet cocks—a portion of my device being broken away for clarity;

Figure 2 is a fragmentary enlarged sectional plan of Figure 1 taken along line 2—2;

Figure 3 is an enlarged side elevation of the device of Figure 1, without the oven;

Figure 4 is a somewhat enlarged transverse section of Figure 3 taken along line 4—4;

Figure 5 is a bottom view of Figure 3;

Figure 6 is a fragmentary perspective of the left end of the guard of Figure 3, showing the yieldable holder and certain of the associated parts in their unfolded condition;

Figure 7 is a fragmentary view like Figure 6, but with the parts folded and bent into their operative position;

Figure 8 is a view substantially like Figure 1, but showing my invention applied to two separate banks of pet cocks which are vertically disposed;

Figure 9 is a fragmentary sectional plan of Figure 8 along line 9—9;

Figure 10 is a fragmentary perspective of a modified form of my invention, showing an independent, detachable yieldable holding member in place; and Figure 11 is a fragmentary sectional plan, substantially like Figure 2, showing the yieldable holding member in an angular or deflected position for use with a pet cock having a relatively long stem.

The main elements of my invention consist of two telescopically fitted covers or guard members 15 and 16 provided in the preferred form of my invention with spring or resilient holder members 17 and 18 respectively. In one form of my invention, as illustrated in Figures 1 to 9, the said holders are an integral part of the said guard members 15 and 16, whereas in a modification, illustrated in Figure 10, the holder is a separate member, as will more fully hereinafter be described. In the forms of my invention illustrated, the telescopic members 15 and 16 are channel-like in structure presenting an opening 19 through which the pet cocks extend when the device is in its operative position, the walls of the two guard members providing complete closures for the pet cocks whereby they are completely concealed from view. However, my invention is not limited to a channel-like or rectangular arrangement of guard members, inasmuch as they can be of any other desired configuration within the scope and intent of this invention.

Members 15 and 16, in the form of my invention disclosed, are made from predetermined flat patterns of sheet metal or other suitable material, and are so folded and bent as to provide closure chambers that are enclosed by the upper and lower sides and outer ends. By referring to Figure 6, it will be noted that in cover member 15 the side wall 20 is bent inwardly at the outer end to form an end flap 21, the wall 22 being bent inwardly at its end to form an outer end flap 23 overlying flap 21, the bottom marginal portion 24 of flap 23 being bent under the bottom edge 25 of flap 21 and along the inner surface thereof, thereby providing a firm engagement between the said two end flaps. The front wall 26 of member 15 (shown at the upper portion of Figure 6) contains an extension 27 which is adapted to be bent down at fold edge 28, until it is flush against the surface of outer flap 23. Extension 27 contains a return bend 29 to form a loop 30, there being a wall 31 extending normally substantially at right angles to the inner loop wall 32. The said wall 31 terminates in a looped portion 33 from which extends a wall 34 adapted for abutting engagement with the adjacent surface of wall 31, as will hereinafter appear. Extending substantially at right angles from wall 34 is the anchor wall 35 and the inwardly bent marginal portion 36.

When the above-described parts are in their assembled position, as shown in Figure 7, as well as in Figures 2, 3 and 5, the said looped portion 29 is in embracing engagement with the return-bend portion 24, loop wall 32 being disposed in the interior of hollow member 15. In the normal position of the parts, walls 31 and 34 are in abutting engagement, to form a resilient holder, as will hereinafter appear, anchoring wall 35 being in abutment with the inner surface of end wall 21, and the flanged end 36 being in abutment with the inner surface of front wall 26.

In the assembled form above described, the resilient holder 17 thus consists of two abutting walls 31 and 34 and the looped or expanded portion 33. Due to the length of walls 31 and 34, as measured by the distance between loop 33 to the outer end walls, it is apparent that the holder 17 can yieldably move towards and away from opening 19, within its dimensional limitations. As will hereinafter appear, this arrangement enables the device to be firmly held in place, or adjustably manipulated into place for various distances between pet cocks and the adjacent oven wall.

In applying this device to an oven, the telescopic parts 15 and 16 are first extended to a position where the holder loops 33 and 33a are farther apart than the maximum distances between the extreme pet cocks. For example, by referring to Figure 1, the said loop portions would be farther apart than the distances between the outer terminals of the pet cocks 37 and 38. Then the device is placed with the bottom edge 39 against the wall 40 of the oven, so that the various pet cocks extend through the opening 19. The two telescopic members 15 and 16 are then brought together until the opposite loops 33 and 33a of the holders 17 and 18 are brought in underlying engagement with the pet cocks 37 and 38. The operative arrangement is such that the loop portions 33 and 33a are in engagement with the rear surfaces 41 of the pet cocks, when the rear edge 39 is in abutment with wall 40. In this position the guard device is firmly held in place, being yieldably maintained against displacement by the coactive holding action of loop portions 33 and 33a and the said edge 39 constituting the periphery of opening 19.

If it is found that the valve stem is unduly long, so as to create a relatively large space 42 (Figure 11) between the pet cock 43 and the wall 40, it is then necessary to bend holders 17 and 18 to make the required angle for best operative results. For example, Figure 11 shows the arrangement where holder 17 had been bent slopingly with respect to the end wall of the device, so that the loop portion 33 is in engagement with the pet cock 43 despite the relatively large distance between the pet cock and wall 40.

To remove the device from the oven, all that it is necessary to do obviously is to slidably move members 15 and 16 outwardly into an extended position, whereby the entire guard can be detached from its engagement with the pet cocks.

It will be noted by referring particularly to Figures 6, 7 and 4, that the side walls 20 and 22 are each provided with extensions 44 and 45. When the holder member 17 is bent into place within the interior of the device, the extensions 44 and 45 are bent upwardly until the ends 46 come into engagement with the wall 31. These extensions therefore serve as stops to prevent a movement of holder 17 (and on the opposite side holder 18) towards and through the opening 19. This is a desirable arrangement, since for best operative results, the peripheral edge 39 should project farther outwardly than the said loop members 33 and 33a.

In Figures 8 and 9 is shown an arrangement of vertical pet cocks 47 separated by a central control device 48 not connected to any jet, but preventing the use of a single guard member. Hence two separate guard devices 49 and 50 are employed precisely in the manner aforesaid. It will be noted that in the form illustrated here, the vertical pet cocks are shown to contain flange portions 51. With this arrangement, the holder member with its loop portion 33 is placed against said flange portion 51, and employed otherwise in the manner aforesaid.

In Figure 10 is shown the modified form of my invention above mentioned. Here, the resilient holder member 52 is an independent element, and consists of two adjacent abutting walls 53 and 54 joined by a looped portion 55. Extending upwardly from wall 54 is anchor wall 56; and extending upwardly from wall 53 is wall 57, the upper portion of which is bent inwardly to form flange 58. It is apparent that this independent holder operates in the manner of the first described form, and is otherwise functionally similar thereto except that it can be removed and replaced.

In the above description, the invention has been disclosed merely by way of example and in preferred manner; but obviously many variations and modifications may be made therein which will still be comprised within its spirit. It is to be understood, therefore, that the invention is not limited to any specific form or manner of practicing same, except in so far as such limitations are specified in the appended claims.

I claim:

1. In a gas stove guard for shielding pet-cocks, two laterally enclosed telescopically fitted cover members of channel-like cross-section and providing a continuous rear opening, wall portions at the opposite outer ends of the said members, resilient holders extending inwardly from said wall portions and each containing a terminal end for engaging the rear surface of a pet-cock, the said terminal ends being disposed a predetermined distance inwardly of the peripheral edge defining the said opening, and stops within said opening in engagement with the rear surfaces of said holders for holding them against rearward movement, whereby the said terminal ends are maintained at least the said predetermined distance inwardly from said peripheral edge.

2. In a gas stove guard for shielding pet-cocks, the combination according to claim 1, said stops being extensions of the lateral sides of the covers folded back and extending forwardly along the inner surfaces of said lateral sides.

3. In a gas stove guard for shielding pet-cocks, two laterally enclosed telescopically fitted cover members of channel-like cross-section and providing a continuous rear opening, the front walls constituting the webs of said channel-like covers each containing at its outer end an extension folded down substantially at right angles to the plane of the web and then extending a predetermined distance inwardly within said opening to a looped terminal portion, and thence outwardly towards the end of the cover and forwardly into engagement with the inner surface of the web, each of said terminal portions being adapted for engagement with the rear surface of a pet-cock.

4. In a gas stove guard for shielding pet-cocks, two laterally enclosed telescopically fitted cover members of channel-like cross-section and providing a continuous rear opening, the lateral walls of the channel-like covers containing end extensions in overlapping engagement to form end wall portions, the front walls of the covers each containing at its outer end an extension folded down substantially at right angles and then extending a predetermined distance inwardly within said opening to a looped terminal portion, and then outwardly to the adjacent end wall portion and forwardly therealong into abutting engagement with the inner surface of the corresponding front wall, each of said terminal portions being adapted for engagement with the rear surface of a pet-cock.

CHARLES CONTERNO.

REFERENCES CITED

The following references are of record in the file of this patent:

UNITED STATES PATENTS

| Number | Name | Date |
| --- | --- | --- |
| 1,588,890 | Horvath | Jan. 15, 1926 |
| 1,662,640 | Garretson | Mar. 13, 1928 |
| 1,726,979 | Droszewski | Sept. 3, 1929 |
| 1,891,078 | Bernstein | Dec. 13, 1932 |
| 1,949,178 | Pack | Feb. 27, 1934 |
| 2,094,441 | Aidala | Sept. 28, 1937 |